(12) United States Patent
Anderson et al.

(10) Patent No.: US 11,501,024 B2
(45) Date of Patent: *Nov. 15, 2022

(54) SECURE MASTER AND SECURE GUEST ENDPOINT SECURITY FIREWALL

(71) Applicant: TEXAS INSTRUMENTS INCORPORATED, Dallas, TX (US)

(72) Inventors: Timothy D. Anderson, University Park, TX (US); Joseph R. M. Zbiciak, San Jose, CA (US); Matthew D. Pierson, Murphy, TX (US); Kai Chirca, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 327 days.

This patent is subject to a terminal disclaimer.

(21) Appl. No.: 16/047,298

(22) Filed: Jul. 27, 2018

(65) Prior Publication Data

US 2018/0357448 A1 Dec. 13, 2018

Related U.S. Application Data

(63) Continuation of application No. 14/062,002, filed on Oct. 24, 2013, now Pat. No. 10,037,439.
(Continued)

(51) Int. Cl.
*G06F 21/78* (2013.01)
*G06F 12/0815* (2016.01)
(Continued)

(52) U.S. Cl.
CPC .......... *G06F 21/78* (2013.01); *G06F 12/0815* (2013.01); *G06F 12/0828* (2013.01);
(Continued)

(58) Field of Classification Search
CPC ...... G06F 21/78; G06F 21/79; G06F 12/1458; G06F 12/1491; G06F 13/1605;
(Continued)

(56) References Cited

U.S. PATENT DOCUMENTS 7,124,170 B1* 10/2006 Sibert .................. G06F 12/145
709/216
2001/0030904 A1* 10/2001 Farmwald .......... G06F 13/1605
711/E12.089
(Continued)

*Primary Examiner* — Victor Lesniewski
(74) *Attorney, Agent, or Firm* — Charles F. Koch; Charles A. Brill; Frank D. Cimino

(57) ABSTRACT

Disclosed embodiments relate to a security firewall having a security hierarchy including: secure master (SM); secure guest (SG); and non-secure (NS). There is one secure master and n secure guests. The firewall includes one secure region for secure master and one secure region for secure guests. The SM region only allows access from the secure master and the SG region allows accesses from any secure transaction. Finally, the non-secure region can be implemented two ways. In a first option, non-secure regions may be accessed only upon non-secure transactions. In a second option, non-secure regions may be accessed any processing core. In this second option, the access is downgraded to a non-secure access if the security identity is secure master or secure guest. If the two security levels are not needed the secure master can unlock the SM region to allow any secure guest access to the SM region.

20 Claims, 9 Drawing Sheets

Related U.S. Application Data

(60) Provisional application No. 61/717,872, filed on Oct. 24, 2012.

(51) Int. Cl.

| | |
|---|---|
| *G06F 21/79* | (2013.01) |
| *G06F 12/14* | (2006.01) |
| *G06F 12/0817* | (2016.01) |
| *G06F 13/16* | (2006.01) |
| *G06F 13/30* | (2006.01) |
| *G06F 12/0831* | (2016.01) |
| *H04L 9/40* | (2022.01) |
| *G06F 13/42* | (2006.01) |
| *G06F 12/1081* | (2016.01) |
| *G06F 13/28* | (2006.01) |
| *G06F 13/40* | (2006.01) |
| *G06F 12/0842* | (2016.01) |

(52) U.S. Cl.
CPC ...... *G06F 12/0831* (2013.01); *G06F 12/0835* (2013.01); *G06F 12/0842* (2013.01); *G06F 12/1081* (2013.01); *G06F 12/1458* (2013.01); *G06F 12/1491* (2013.01); *G06F 13/1605* (2013.01); *G06F 13/1626* (2013.01); *G06F 13/1663* (2013.01); *G06F 13/287* (2013.01); *G06F 13/30* (2013.01); *G06F 13/4022* (2013.01); *G06F 13/42* (2013.01); *G06F 21/79* (2013.01); *H04L 63/0263* (2013.01); *G06F 2212/1032* (2013.01); *G06F 2212/283* (2013.01); *G06F 2212/62* (2013.01); *G06F 2212/621* (2013.01); *Y02D 10/00* (2018.01)

(58) Field of Classification Search
CPC .. G06F 13/30; G06F 12/0842; G06F 12/0835; G06F 12/1081; G06F 12/0828; G06F 12/0831; G06F 12/0815; G06F 13/287; G06F 13/4022; G06F 13/42; G06F 13/1626; G06F 13/1663; H04L 63/0263
See application file for complete search history.

(56) References Cited

U.S. PATENT DOCUMENTS

| | | | |
|---|---|---|---|
| 2002/0163522 A1* | 11/2002 | Porter | G06F 12/1458 345/533 |
| 2003/0188184 A1* | 10/2003 | Strongin | G06F 21/52 726/30 |
| 2004/0177269 A1* | 9/2004 | Belnet | G06F 12/1491 726/27 |
| 2004/0230818 A1* | 11/2004 | Craft | G06F 12/1466 713/193 |
| 2005/0165783 A1* | 7/2005 | Hyser | G06F 21/82 707/999.009 |
| 2006/0117150 A1* | 6/2006 | Baumhof | G06F 13/1605 711/147 |
| 2006/0184804 A1 | 8/2006 | Varma et al. | |
| 2006/0212945 A1* | 9/2006 | Donlin | G06F 21/53 726/29 |
| 2007/0011419 A1 | 1/2007 | Conti | |
| 2007/0079093 A1 | 4/2007 | Axford et al. | |
| 2008/0072004 A1 | 3/2008 | Kershaw | |
| 2008/0091917 A1* | 4/2008 | Dixon | G06F 12/1441 712/1 |
| 2009/0089526 A1* | 4/2009 | Kuo | G11C 16/22 711/E12.091 |
| 2010/0057960 A1* | 3/2010 | Renno | G06F 12/1433 710/110 |
| 2010/0082927 A1* | 4/2010 | Riou | G06F 12/14 711/163 |
| 2011/0093750 A1 | 4/2011 | Williams et al. | |
| 2011/0153926 A1 | 6/2011 | Fang et al. | |
| 2011/0314538 A1 | 12/2011 | Huang et al. | |
| 2012/0036347 A1* | 2/2012 | Swanson | G06F 21/85 711/E12.091 |
| 2012/0144140 A1* | 6/2012 | Rossa | G06F 12/1425 711/E12.091 |
| 2012/0191899 A1 | 7/2012 | Zbiciak et al. | |
| 2013/0179892 A1 | 7/2013 | Frazier et al. | |
| 2013/0326193 A1 | 12/2013 | McCarthy et al. | |

\* cited by examiner

| 31 | 30      16 | 15          8 | 7        1 | 0 |
|----|------------|---------------|------------|---|
| NS | RESERVED   | SM_MSTID_INT  | RESERVED   | LK |

FIG. 13

| 31 | 30      16 | 15          8 | 7        1 | 0 |
|----|------------|---------------|------------|---|
| 0  | RESERVED   | SM_MSTID_INT  | RESERVED   | 1 |

FIG. 14

| 31 | 30      16 | 15          8 | 7        1 | 0 |
|----|------------|---------------|------------|---|
| 1  | RESERVED   | SM_MSTID_INT  | RESERVED   | 0 |

FIG. 15

SECURE MASTER AND SECURE GUEST ENDPOINT SECURITY FIREWALL

CROSS-REFERENCE TO RELATED APPLICATIONS

This application is a continuation of U.S. patent application Ser. No. 14/062,002 filed Oct. 24, 2013, which claims priority to U.S. Provisional Application No. 61/717,872, filed Oct. 24, 2012, which are incorporated by reference herein.

TECHNICAL FIELD

The technical field of this invention is cache for digital data processors.

BACKGROUND OF THE INVENTION

Security sensitive applications need hardware to ensure that secure data isn't tainted by non-secure or compromised secure processes. Many systems implement an endpoint firewall which involves the notion of secure and non-secure transactions to guarantee this. However, if a secure core is compromised the protection can no longer be guaranteed as that core now has the key to access the secure data. All secure data in this case is compromised as it is not possible to distinguish between the compromised requestor and a non-compromised requestor.

BRIEF SUMMARY

Security sensitive applications need hardware to ensure that secure data isn't tainted by non-secure or compromised secure processes. Many systems implement an endpoint firewall which involves the notion of secure and non-secure transactions to guarantee this. However, if a secure core is compromised the protection can no longer be guaranteed as that core now has the key to access the secure data. All secure data in this case is compromised as it is not possible to distinguish between the compromised requestor and a non-compromised requestor.

Our firewall introduces a new security hierarchy that includes multiple secure levels: secure master (SM); secure guest (SG); and non-secure (NS). The secure level is broken into two pieces with one secure master (identified by masterID tag) and n secure guests (not distinguished by masterID tag). The firewall includes one secure region for secure master and one secure region for secure guests. This allows two distinct secure spaces. The SM region only allows access from the secure master and the SG region allows accesses from any secure transaction. Finally, the non-secure region can be implemented two ways. In a first option, non-secure regions may be accessed only upon non-secure transactions. In a second option, non-secure regions may be accessed any processing core. In this second option, the access is downgraded to a non-secure access if the security identity is secure master or secure guest. Selection between these two options is preferably done via a non-secure or secure device tieoff. If the two security levels are not needed the secure master can unlock the SM region to allow any secure guest access to the SM region.

BRIEF DESCRIPTION OF THE DRAWINGS

These and other aspects of this invention are illustrated in the drawings, in which:

FIG. 13 illustrates a secure master configuration register which sets security firewall attributes;

FIG. 14 illustrates default secure master configuration register values for a secure device; and FIG. 15 illustrates default secure master configuration register values for a non-secure device.

DETAILED DESCRIPTION

Figure 1:
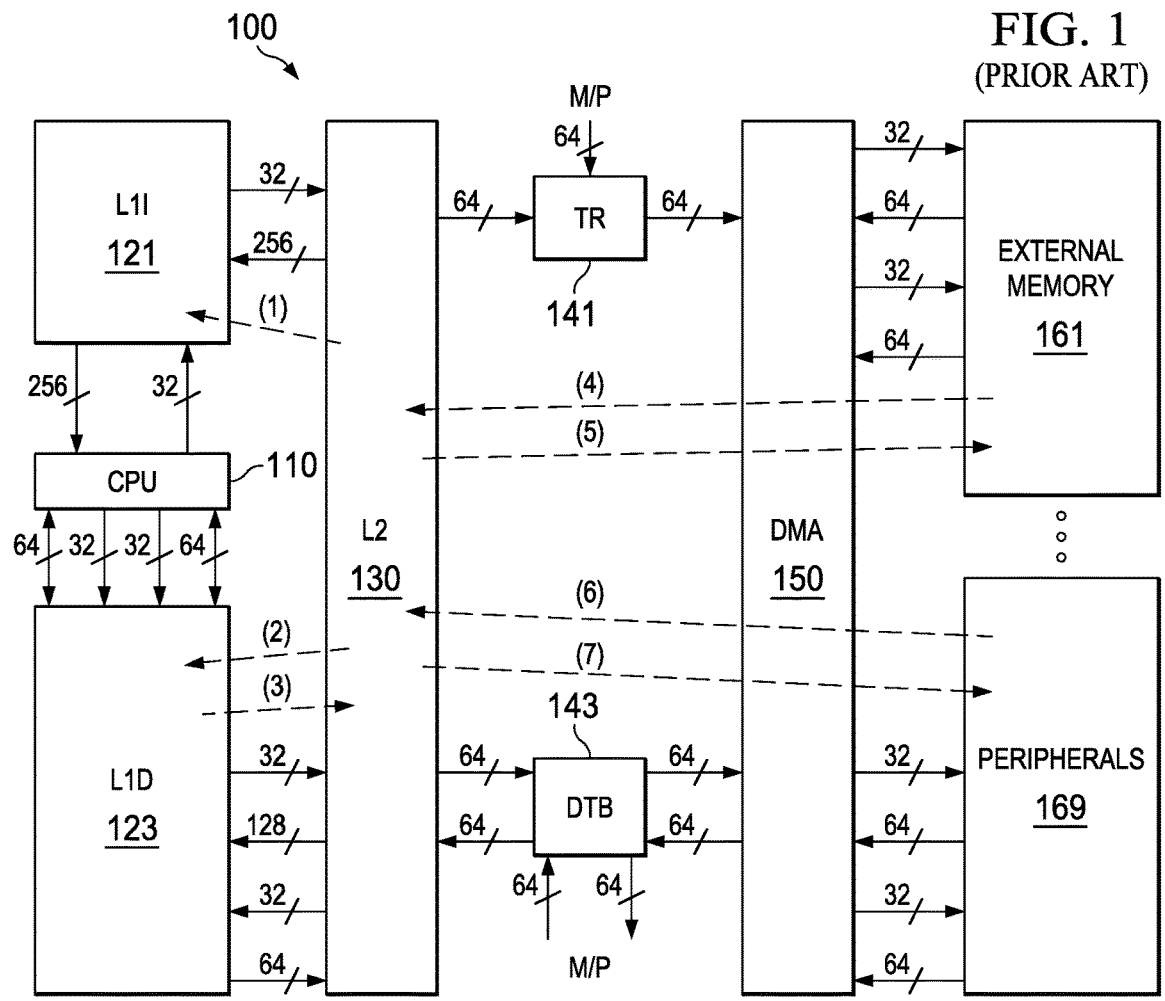
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
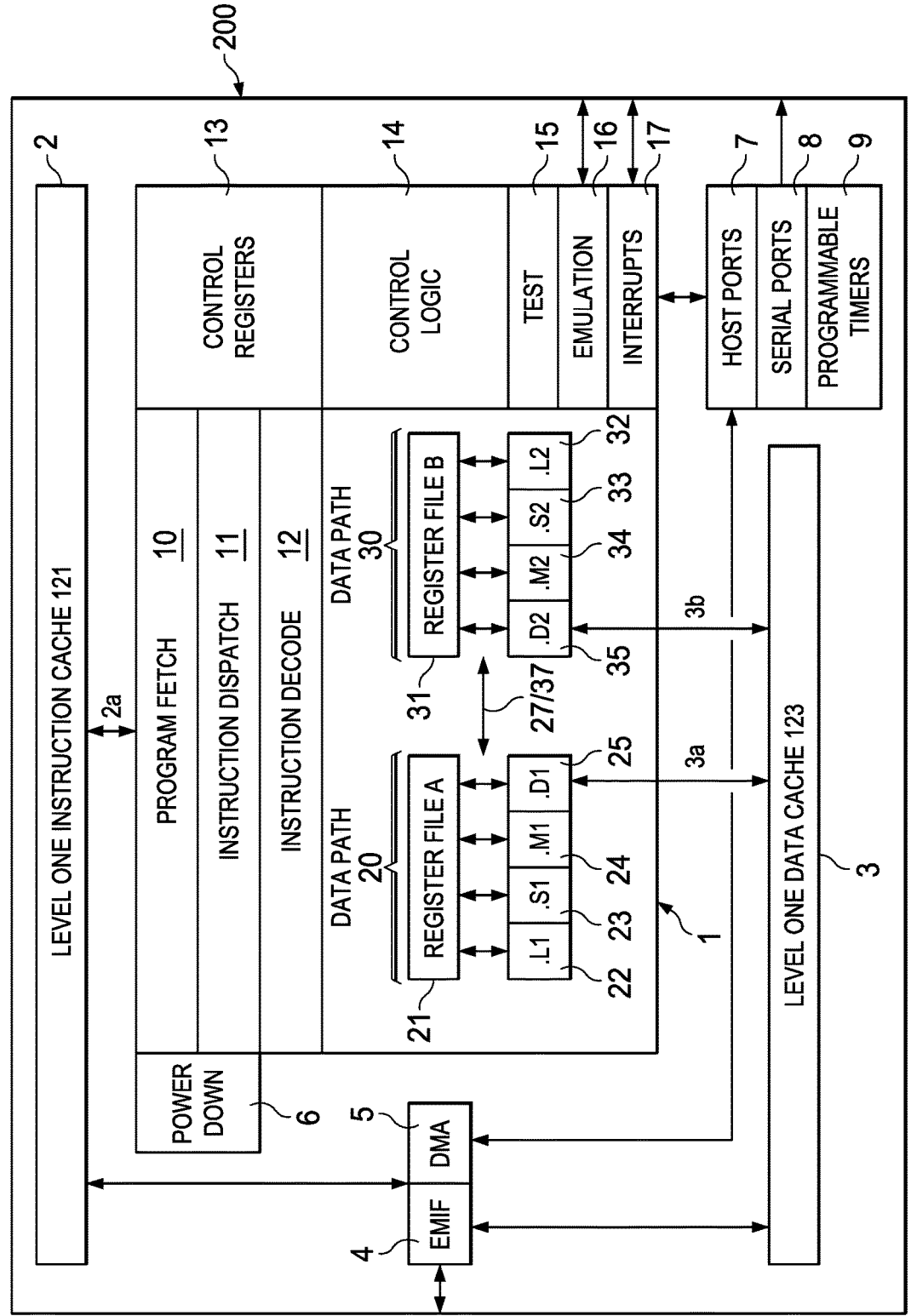
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
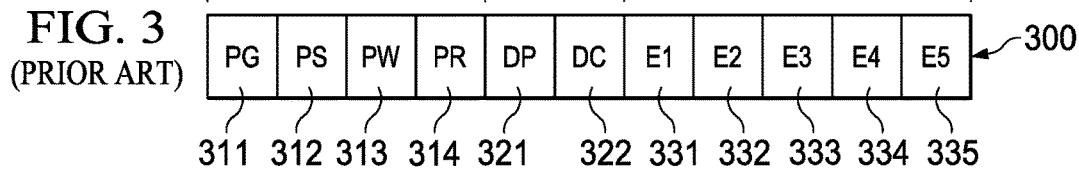
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
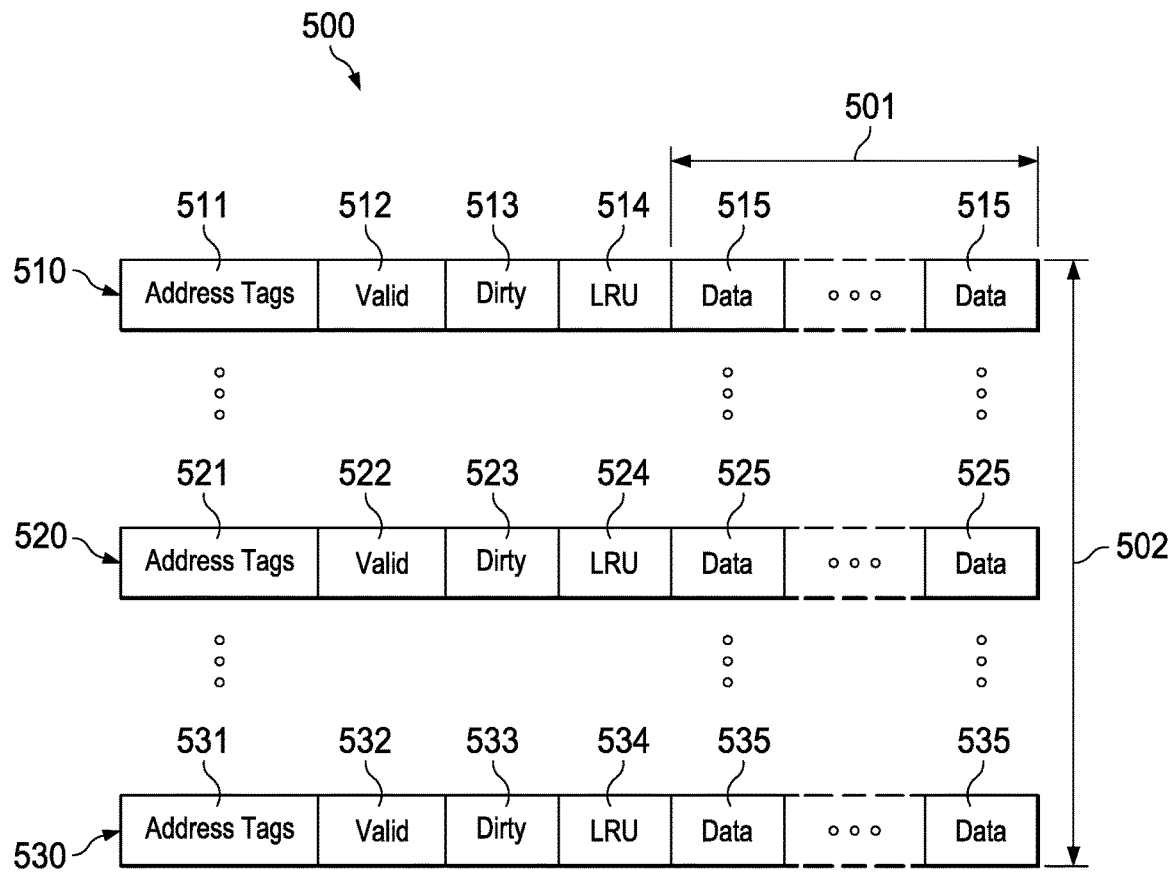
FIG. 4 illustrates the instruction syntax of the very long instruction word digital signal processor core illustrated in FIG. 2 (prior art)
FIG. 5 illustrates the details of a set of typical prior art cache lines (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 2 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 2 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 130 illustrated in FIG. 1. Cache 500 illustrated in FIG. 5 includes cache lines 510, 520 and 520 are representative of the internal structure of cache 500. Each of cache lines 510, 520 and 530 includes: respective address tags 511, 521 and 522; respective valid bits 512, 522 and 523; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 161 which are accessed by a multi-bit address. Cache 500 is organized to facilitate this storage and to facilitate finding such data in the cache. Each cache line 510, 520 and 530 typically stores $2^N$ respective data words 515, 525 and 535, when N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed. Upon a detecting a match, the position within the cache line along dimension 501 corresponds to the least significant bits of the address permitting identification of the data word accessed.

Each data word 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 130 would not be loaded. Thus they would not store valid data. Accordingly, all cache lines are initially marked invalid. During a cache access a match of a requested address with address tags 511, 521 or 531 would not detect a match unless the corresponding valid bit 512, 522 or 532 indicated the data was valid.

Each data word 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accessed and write accesses. Upon a cache hit for a write access, the write data is written into the corresponding location within cache 500. According to the preferred writeback technique, this write data is not immediately forwarded to external memory 161. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 161.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced the LRU bits indicate the least recently used way for replacement. Maintaining cache coherence requires writeback of a dirty way upon such replacement.

Figure 6:
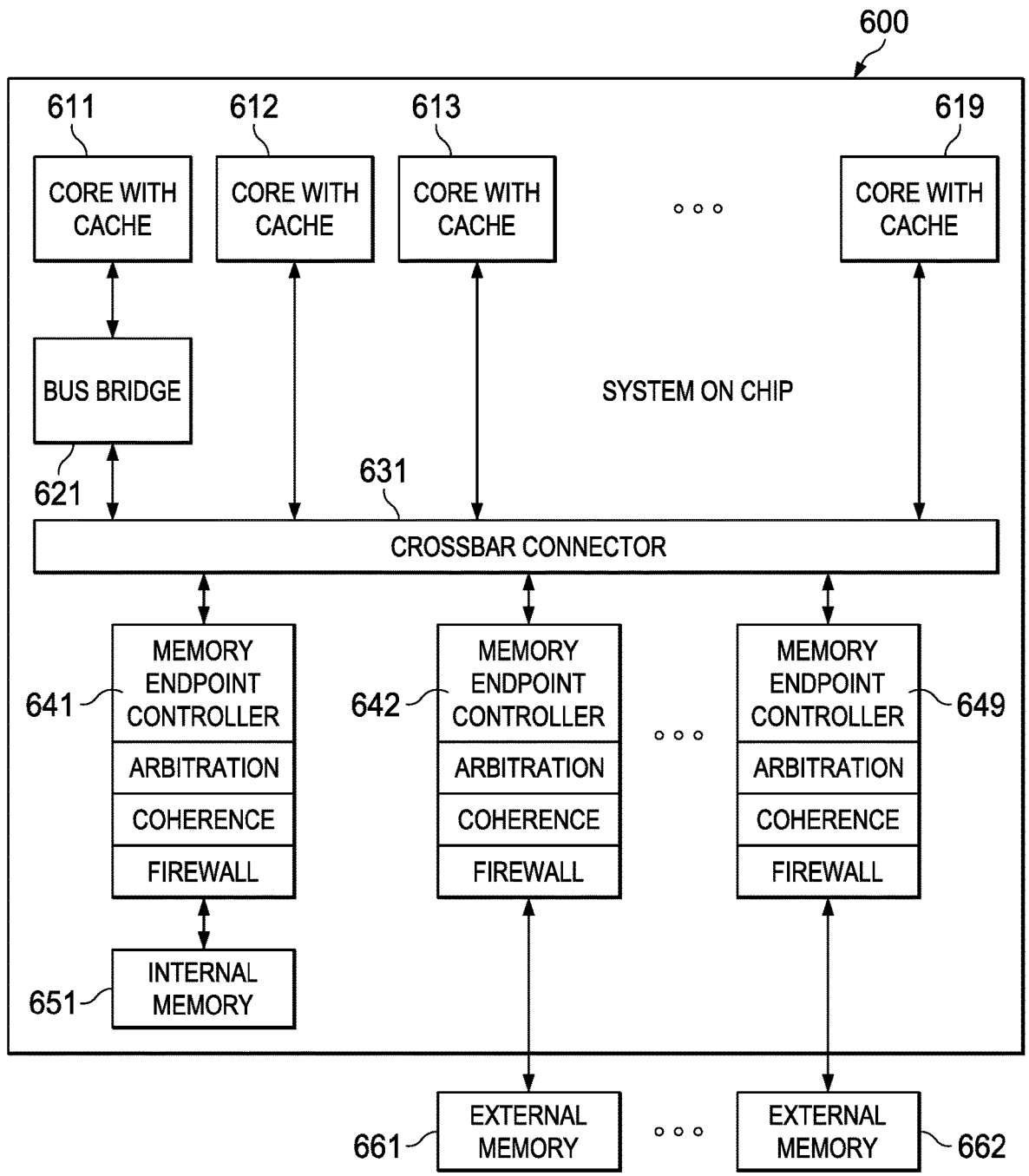
FIG. 6 illustrates a preferred embodiment of a system on a chip of this invention.

FIG. 6 illustrates the construction of system on chip (SoC) 600 according to this invention. SoC 600 includes plural processing cores with cache 611, 612, 613 . . . 619. At least one of processing cores with cache 611, 612, 613 . . . 619 is preferably constructed as illustrated in FIGS. 1 and 2. FIG. 6 illustrates that core with cache 611 is connected to crossbar connection 631 via bus bridge 621. Details of the preferred embodiment of bus bridge 621 is given below in FIG. 7. FIG. 6 illustrates four processing cores with cache 611, 612, 613 . . . 619 but this invention could be practiced with any suitable plural number of processing cores with cache.

Crossbar connection 631 can simultaneously connect any of processing cores with cache 611, 612, 613 . . . 619 with any of memory endpoint controllers 641, 642 . . . 649. Crossbar connector 631 can simultaneously make any non-interfering connection. A non-interfering connection includes connections with only one processing core with cache and only one memory endpoint controller. Crossbar connector 631 cannot connect more than one processing core with cache to a single memory endpoint controller simultaneously nor can it connect a single processing core with cache to more than one memory endpoint controller simultaneously.

Each of memory endpoint controllers 641, 642 . . . 649 controls access to a memory or memory-like peripheral such as peripherals 169 illustrated in FIG. 1. This access control includes access arbitration, coherence control and a security firewall. Details of these operations will be described below. This construction distributes coherence control from the processing cores with cache 611, 612, 613 . . . 619 to the memories. Memory coherence controller 641 controls access to on-chip internal memory 651. Memory endpoint controller 642 controls access to external memory 661. Memory endpoint controller 649 controls access to external memory 669.

Figure 7:
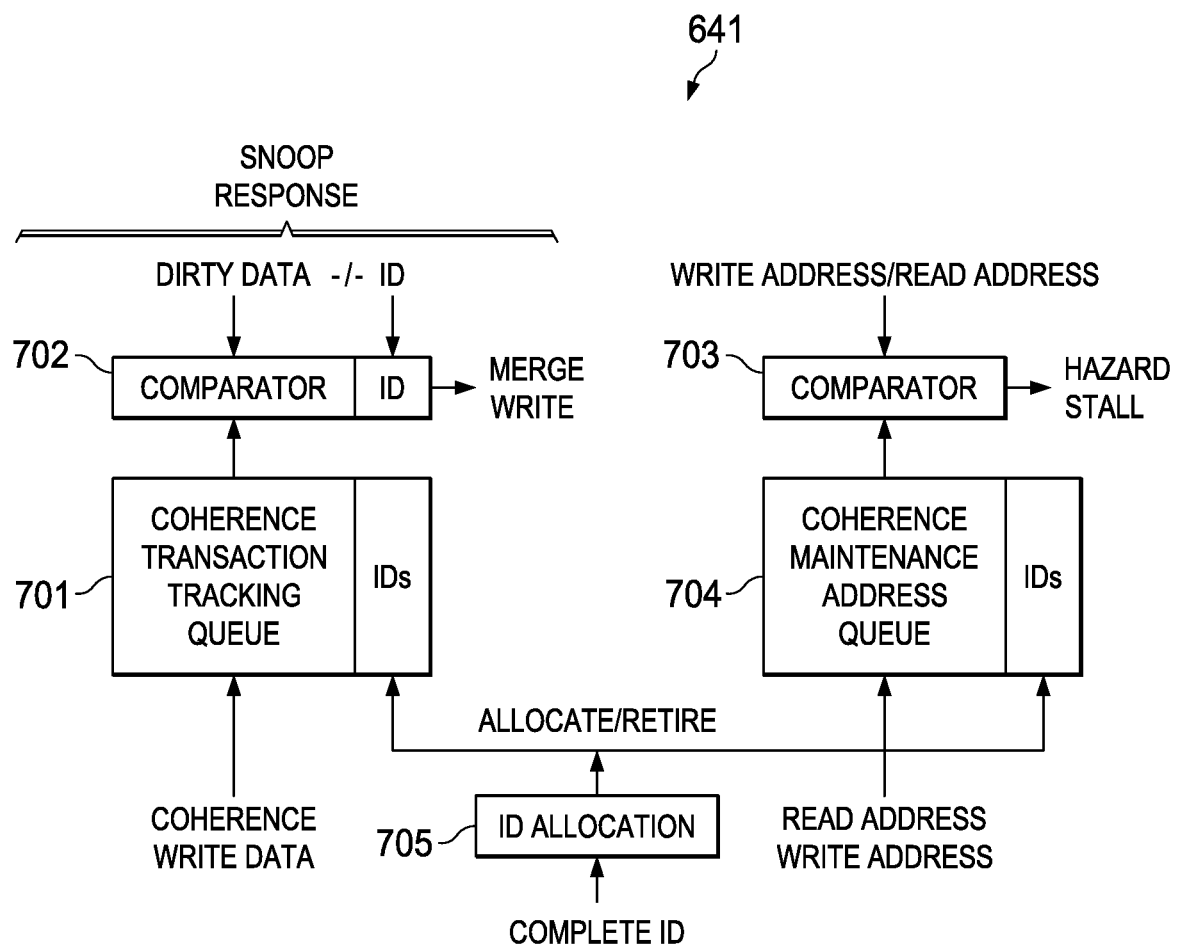
FIG. 7 illustrates a detail of one embodiment of a portion of a memory endpoint controller constructed to practice the distributed coherence control of this invention.

FIG. 7 illustrates a detail of one embodiment of a portion of memory endpoint controller 641 constructed to practice the distributed coherence control of this invention. Note that conventional parts needed for a practical embodiment are omitted for clarity. The following description mentions access addresses. It is known in the art that these addresses need not be the complete endpoint memory address. A number of least significant bits of these addresses could be truncated so that the addresses refer to a larger quantity of data such as a whole cache line.

FIG. 7 illustrates coherence data for a coherence write operation. A coherence write operation includes a non-allocated write and a cache line eviction. Upon a cache miss, a processing core may allocate a cache line to store the data of the memory access generating the cache miss. This cache line is one way of a set corresponding to the memory access address. If the cache line to be replaced is dirty, then the dirty data must be written out to the next level memory. This process is called a victim eviction.

Memory endpoint controller 641 immediately commits the coherence write operation to the endpoint memory. Coherence transaction tracking queue 701 stores the data of this write operation and an assigned ID tag. In a preferred embodiment, the whole data is not stored but only write enable strobes corresponding to the cache dirty tags. Operation with this variation is further explained below.

ID allocation block 705 allocates an identifier to this queue entry. In the preferred embodiment this identifier is a 4-bit ID tag. In the preferred embodiment ID allocation block 705 allocates the lowest unused ID tag rather than using a first-in-first-out scheme. Note that if there are no available ID tags for ID allocation block 705 to assign, then the access stalls until an ID tag is free.

Memory endpoint controller 641 issues a snoop request to all processing cores that may cache the data of the coherence write. Each snoop request includes the ID tag assigned to the coherence write data queue entry. No merge operation is needed if the snoop response is Not Cached, Cached and Clean, or Cached and Dirty where the same coherence write data and snoop data are dirty. Comparator 702 compares the coherence write data in coherence transaction tracking queue 701 having the ID tag of the snoop return. If the snoop return is Cached and Dirty with different dirty data in the snoop return than in the coherence write, then comparator 702 triggers a merge write operation. This merge write operation includes only data dirty in the snoop response and clean in the coherence write. As noted above coherence write data queue may store only the corresponding dirty tags or derived write enable strobes. This data and the snoop return data and the dirty tags corresponding to the snoop data from the other processing core are sufficient to determine the data for the merge write. This is advantageous because the dirty tags or write enable strobes comprise less data to be stored in coherence write data queue than the data itself.

Coherence maintenance address queue 704 stores the address of each endpoint memory access. On transmitting an access to the endpoint memory, ID allocation block 705 allocates an ID tag and opens an entry in coherence maintenance address queue 704. In the preferred embodiment, ID allocation block 705 uses the same block of 4-bit ID tags for coherence transaction tracking queue 701 and coherence maintenance address queue 704. As previously described, ID allocation block 705 preferably allocates the lowest unused ID tag.

Comparator 703 compares the addresses of all read or write accesses to the entries of coherence maintenance address queue 704. If the addresses do not match, the access is not stalled. If the addresses match, then comparator 703 stalls the current access. Eventually the blocking entry in coherence maintenance address queue 704 will be retired by completion signal from the endpoint memory. The endpoint memory identifies the completion signal by the corresponding ID tag assigned initially by ID allocation block 705. Thereafter the previously stalled access will no longer be blocked.

Figure 8:
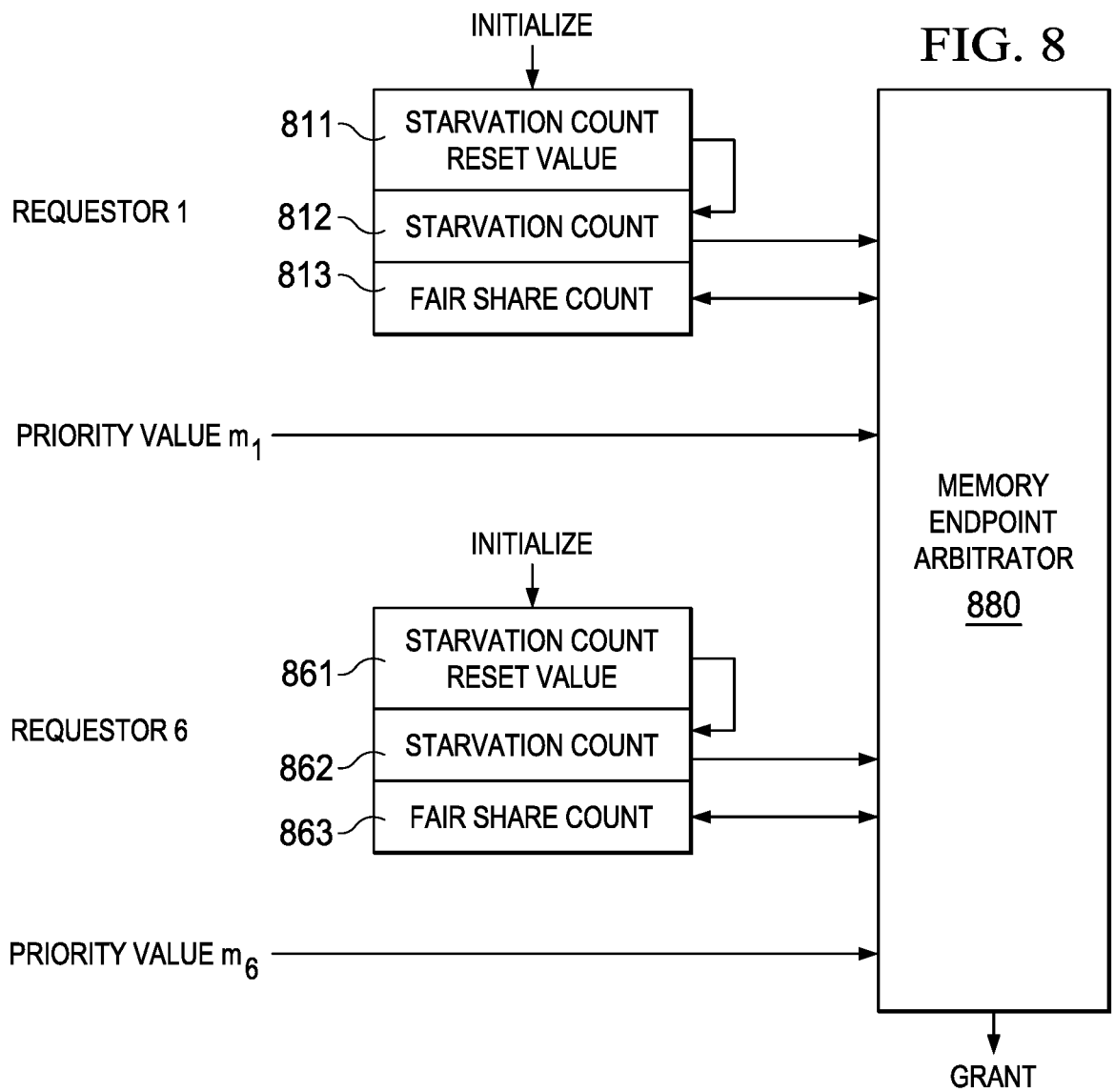
FIG. 8 illustrates relevant portions of the hardware of the arbitration portion of each memory endpoint controller of this invention.

FIG. 8 illustrates that each requestor provides a priority level m to the memory endpoint arbitrator 880. This priority level m is a function of the particular application running on the requestor and the nature of the requestor. This priority level m is expected to be relatively static during operation. A fair share count register (813, 863) is assigned to each requestor. The value of this fair share count register is supplied to memory endpoint arbitrator 880. The fair share value is used to select among requestors presenting the same priority level m in a manner that will be explained below. A starvation count reset value (811, 861) and a starvation count register (812, 862) are provided for each requestor. The starvation count reset value is preferably writable by a memory mapped configuration write. The starvation count is initially set to the corresponding starvation count reset value. The starvation count value is changed as detailed below. The starvation count primarily ensures that low priority requestors are not completely shut out by higher priority requestors.

Figure 9:
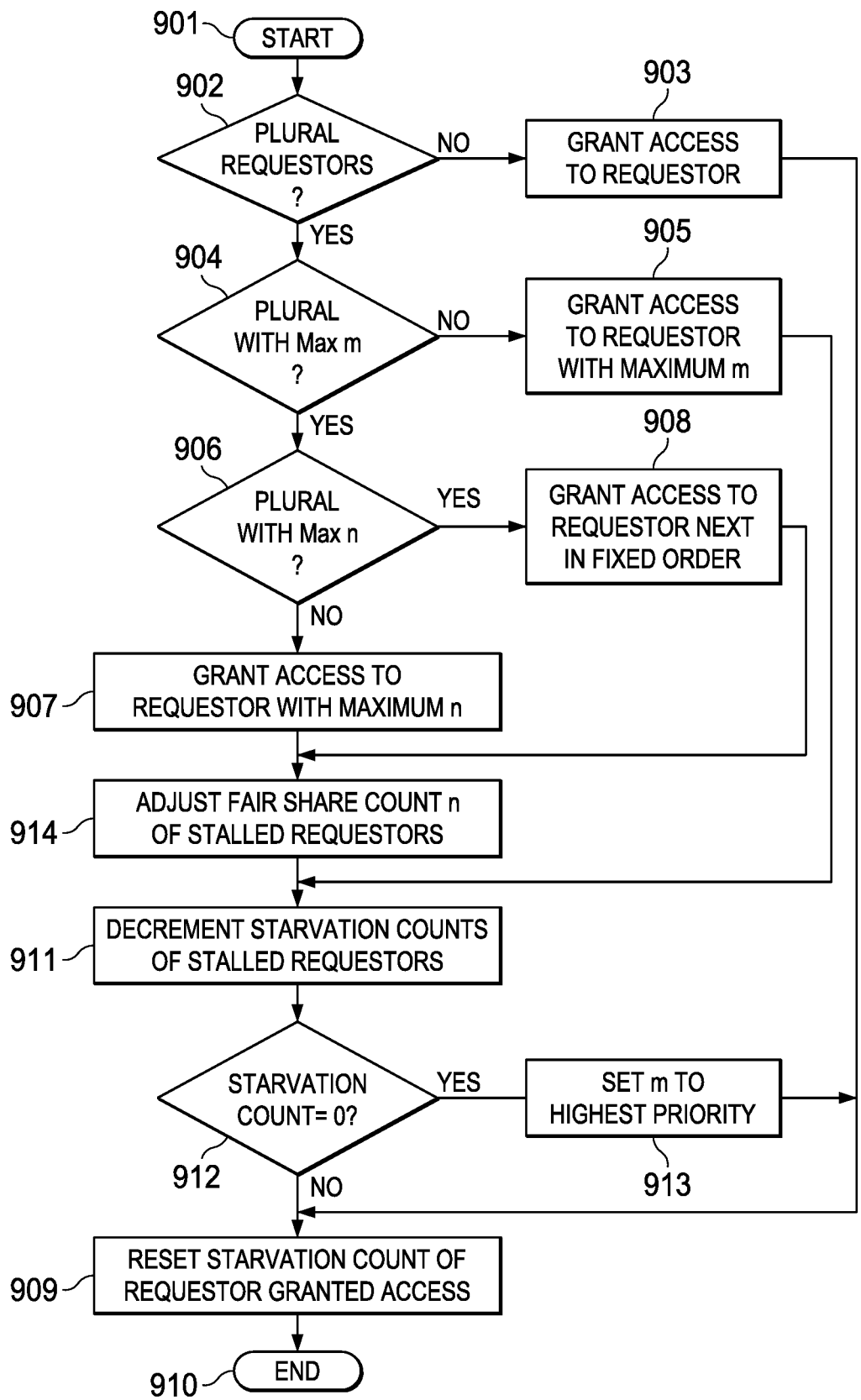
FIG. 9 illustrates the steps in the priority scheme of this invention.

FIG. 9 illustrates the steps in the priority scheme 900 of this invention. Priority scheme 900 begins with start block 901 indicating at least one access request is pending. Step 902 determines whether there are plural pending access requests. If there is only a single access request pending (No at step 902), then the pending request is granted access in step 903. Step 909 resets the starvation counter for the requestor granted access. Scheme 900 is then complete for the current cycle and exits at end block 910.

If there are plural requests for access pending (Yes at step 902), then step 904 determines the highest priority level m among the plural pending requests and whether there are plural pending requests having this highest priority level. If there is a single pending request having the highest priority level m (No at step 904), then this pending request with the highest priority level m is granted access in step 905.

Priority scheme 900 then adjusts the starvation counters. Step 911 decrements the starvation count of any stalled, pending access. Step 912 determines whether any decremented starvation count has reached zero. If a starvation counter has reached zero (Yes at step 912), step 913 sets the priority m of any such requestor at the highest priority. If a starvation counter had not reached zero (No at step 912) or following step 913, step 909 resets the starvation counter for the requestor granted access. Scheme 900 is then complete for the current cycle and exits at end block 910.

If there are plural pending requests having the highest priority level m (Yes at step 904), then step 906 determines whether there plural requestors having both this maximum priority level m and the same maximum fair share count n. If there is only one such requestor (No at step 906), then step 907 grants access to that requestor. Step 914 adjusts the fair share counts of all pending requestors including the requestor granted access. The fair share count n of each stalled requestor having the maximum priority level m is incremented by 1. The fair share count n of the requestor granted access is decremented by the number of stalled requestors with the same priority level m. This process maintains the sum of the fair share levels m. Step 911 decrements the starvation count of any stalled, pending access. Step 912 determines whether any decremented starvation count has reached zero. If a starvation counter has reached zero (Yes at step 912), step 913 sets the priority m of any such requestor at the highest priority. If a starvation counter had not reached zero (No at step 912) or following step 913, step 909 resets the starvation counter for the requestor granted access. Scheme 900 is then complete for the current cycle and exits at end block 910.

If plural requestors have both the same maximum priority level m and the same maximum fair share count n (Yes at step 906), then step 908 selects a requestor for access grant based upon a fixed order among the plural requestors.

Step 914 adjusts the fair share counts of all pending requestors including the requestor granted access as previously described. Step 911 decrements the starvation count of any stalled, pending access. Step 912 determines whether any decremented starvation count has reached zero. If a starvation counter has reached zero (Yes at step 912), step 913 sets the priority m of any such requestor at the highest priority. If a starvation counter had not reached zero (No at step 912) or following step 913, step 909 resets the starvation counter for the requestor granted access. Scheme 900 is then complete for the current cycle and exits at end block 910.

The arbitration priority level of a transaction is tracked in terms of a tuple <m,n> where m is the priority level specified in the VBusM command and n is the weighted age-based priority modifier called a fair-share count generated by the arbitration scheme that is tracked per requestor in each arbiter. The fair-share counters for all requestors are initialized to 0 at reset. The three levels are:

1. The arbiter at each available bank selects the request with the highest priority level m.
2. If more than one request has the highest priority value for m, among these requests, the request with the higher fair-share count value n is selected.

3. If there is still a tie, a fixed priority among requestors is used to break this tie.

The fair share count assures equal access among requestors having the same priority level m. The fair share count causes access grant to rotate among these requestors.

The starvation count system prevents a low priority requestor from being permanently frozen out of access. The priority level m set to the highest priority if the requestor has been continuously stalled for the number of cycles set in the starvation count. Upon promotion of priority the requestor may not gain access the next cycle because there may be another highest priority requestor seeking access. The fair count assures this promoted requestor will obtain access. Resetting the starvation count upon access (step 909) also resets the promoted priority level to the requestor's base priority level.

With different types of processing cores in the same multi-core system, memory controller provides a shared low latency high bandwidth on-chip memory and central memory controller of the off-chip memories for all the processors connected with it. Typically different types of processing cores are used for different applications. For example, DSPs core may act as L1/L2 processors and ARM™ core may act as L3 host processor. It is advantageous to provide isolations between the memory spaces different processing cores access. This invention provides firewalls for the Snared memories, both on-chip internal memory 651 and off-chip memory such as external memories 661 to 662.

Each memory transaction includes transaction attributes. In the preferred embodiment these transaction attributes are usually provided by the processing core based on the secure mode it enters and the privilege level of the currently running software. Not illustrated in FIG. 6, a direct memory access (DMA) unit when acting as the agent of a processing core inherits the transaction attribute of the processing core. In the preferred embodiment of this invention not all secure supervisors are treated equally because multiple CPU/DSPs coexist in the shared system.

This invention includes the following security hierarchy having three secure levels: Secure Master (SM); Secure Guest (SG); and Non-Secure (NS). In this invention there is a single secure master identified by a masterID tag and plural secure guests not distinguished by a masterID tag. The firewall of this invention defines one secure master region and one secure guest region allowing two distinct secure spaces. If the two security levels are not needed the secure master can unlock the SM region to allow any secure guest access to the SM region.

Figure 10:
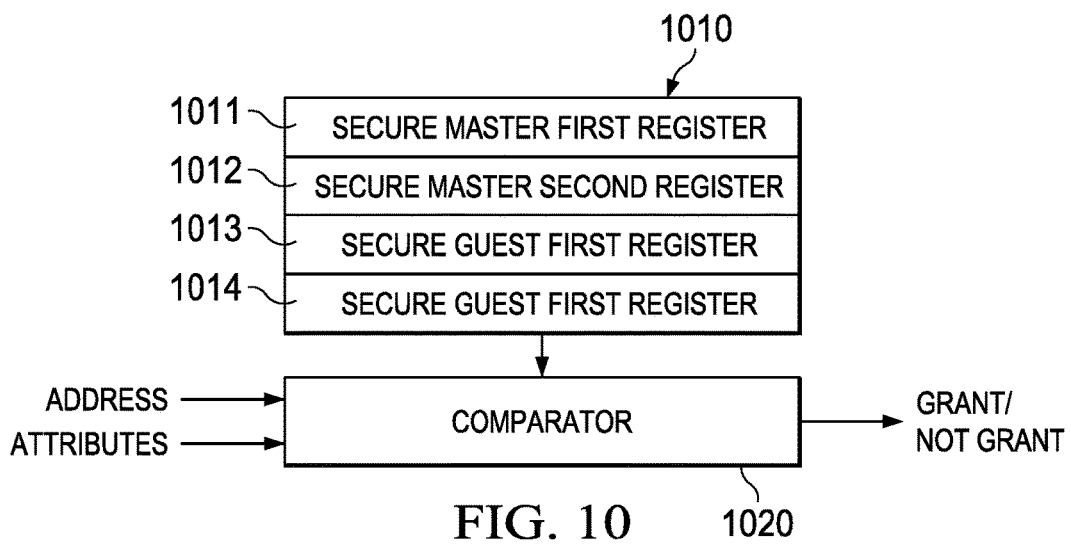
FIG. 10 illustrates a security firewall according to a preferred embodiment of this invention.
Figure 11:
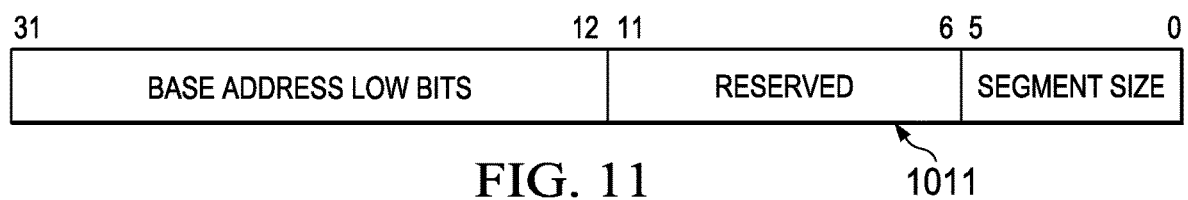
FIG. 11 illustrates a secure master first register.

FIG. 10 illustrates the security firewall according to a preferred embodiment of this invention. Security registers 1010 stores the definition of the address limits of a secure master region and of a secure guest region. These registers include: secure master first register 1011; secure master second register 1012; secure guest first register 1013; and secure guest second register 1014. In the preferred embodiment secure master first register 1011, secure master second register 1012, secure guest first register 1013 and secure guest second register 1014 are located within the memory endpoint controller coupled to the memory endpoint protected. FIG. 11 illustrates secure master first register 1011. Secure master first register 1011 has a first field of bits 12 to 31 specifying the low order bits of the region's base address (base address low). Bits 6 to 11 are reserved and unused. Bits 0 to 5 specify the region size. Table 2 shows the coding of the region size field.

TABLE 2

| Region Size Field | Region Size |
|---|---|
| <00 1011 | Reserved |
| 00 1011 | 4 KB |
| 00 1100 | 8 KB |
| 00 1101 | 16 KB |
| 00 1110 | 32 KB |
| 00 1111 | 64 KB |
| 01 0000 | 128 KB |
| 01 0001 | 256 KB |
| 01 0010 | 512 KB |
| 01 0011 | 1 MB |
| 01 0100 | 2 MB |
| 01 0101 | 4 MB |
| 01 0110 | 8 MB |
| 01 0111 | 16 MB |
| 01 1000 | 32 MB |
| 01 1001 | 64 MB |
| 01 1010 | 128 MB |
| 01 1011 | 256 MB |
| 01 1100 | 512 MB |
| 01 1101 | 1 GB |
| 01 1110 | 2 GB |
| 01 1111 | 4 GB |
| 10 0000 | 8 GB |
| 10 0001 | 16 GB |
| 10 0010 | 32 GB |
| 10 0011 | 64 GB |
| 10 0100 | 128 GB |
| 10 0101 | 256 GB |
| 10 0110 | 512 GB |
| 10 0111 | 1 TB |
| >10 0111 | Reserved |

Figure 12:
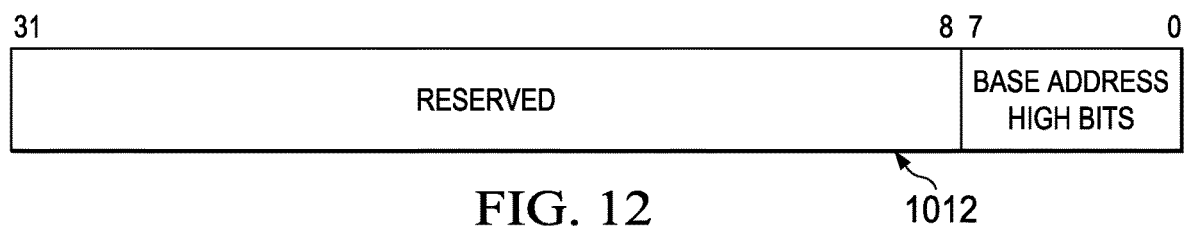
FIG. 12 illustrates a secure master second register, these first and second registers together defining the secure region of memory.

FIG. 12 illustrates secure master second register 1012. Bits 8 to 31 are reserved and unused. Bits 0 to 7 specify the high order bits of the region's base address (base address high). The specification of the secure guest region of memory employs secure guest first register 1013 and secure guest second register 1014 similarly encoded. The non-secure region is every other part of the address space.

Comparator 1020 receives the address from the processing core and a security indicator. In accordance with a preferred embodiment of this invention there are three states: secure master; secure guest; and non-secure. Comparator 1020 uses the offered address and the secure indicator to determine whether the access is permitted.

If the offered address is in the secure master region defined by secure master first register 1011 and secure master second register 1012, comparator 1020 grants access only if the security indicator is secure master. If the offered address is in the secure guest region defined by secure guest first register 1013 and secure guest second register 1014, comparator 1020 grants access if the security indicator is secure master or secure guest. There are two options if the offered address is in the non-secure region. In a first option, comparator 1020 grants access only upon non-secure transactions. In a second option, comparator 1020 grants access to any processing core. In this second option, the access is downgraded to a non-secure access if the security indicator is secure master or secure guest. Selection between these two options is preferably done via a non-secure or secure device tieoff.

Comparator 1020 permits regions defined by the register pairs to overlap. In such a case a secure master designation controls for any memory region defined as both secure master and secure guest. Using this technique it is possible for the secure guest region to be discontinuous.

In the preferred embodiment SoC 600 separately defines secure master and secure guest regions for internal memory 651 and for external memory. Thus SoC 600 defines these four regions: internal memory 651 secure master; internal memory 651 secure guest; off-chip secure master; and off-chip secure guest. Off-chip memory is preferably accessed by an external memory interface (EMIF) not illustrated in FIG. 6.

The secure master first register 1011, secure master second register 1012, secure guest first register 1013 and secure guest second register 1014 are preferably memory mapped registers writable by an appropriate processing core. The secure master range register pairs 1011 and 1012 may only be updated by secure supervisor accesses that come with the secure master ID VBUS attribute. The secure guest range register pairs 1013 and 1014 may be updated by any secure supervisor (secure guest or secure master) access.

Currently, the base address and segment size fields illustrated in FIG. 11 support 40-bit addressing which can define up to a 1 TB space. The registers are defined for possible future expansion up to 64-bit addressing. The smallest allowable secure region size is 4 KB in the present embodiment. Table 2 shows segment size codings are reserved to allow future expansion to smaller region sizes.

FIG. 13 illustrates a secure masterID configuration register (SMIDCFG) 1301 which sets up the security firewall attributes including secure status of the distinguishing SM from SG accesses, and controlling SG access to SM regions. Bit 31 of secure master ID configuration register 1301 is a non-secure bit (NS). If the NS bit is 0, secure memory regions are enabled. Accesses that hit any of the defined secure regions must pass the security protection check. If the NS bit is 1, then all memory on this memory endpoint controller 641, 642 . . . 649 is non-secure. Transactions at any security level may access the corresponding memory endpoint. On non-secure devices this field is forced to non-secure and cannot be overridden to secure.

Bits 8 to 15 of secure master ID configuration register 1301 are a SM_MSTID_INT field. This field identifies which masterID is currently designated as the secure master.

Bit 0 of secure master ID configuration register 1301 is a lock/unlock bit (LK). If this bit is 0 (unlocked), then secure guests are granted permission to access the secure master memory region. If this bit is 1 (locked), then only the secure master may access the defined secure master memory region.

Secure master ID configuration register 1301 may be updated only by the secure master regardless of the value of NS or LK. The SM_MSTID_INT field may not be updated by writing to this register. Once the LK field in this register is updated to unlocked, it cannot be locked again by any access. The device must be reset to re-enter the Locked state. All privilege level accesses may read the secure master ID configuration register 1301.

After reset, the default secure master configuration depends on an overall device security tieoff. On a secure device, the entire SRAM and EMIF address range (1 TB) is owned by secure master and all secure guests are locked out. FIG. 14 shows the default values for secure master ID configuration register 1301 on a secure device. This default value shows secure (NS=0) and locked. (LK=1). On a non-secure device the entire address range is non-secure. FIG. 15 shows the default values for secure master ID configuration register 1301 on a non-secure device. This default value shows non-secure (NS=1) and unlocked (LK=0).

The invention claimed is:

1. An electronic device comprising:
   at least one processing core that includes a plurality of master IDs;
   a security configuration register to store security privilege configuration information, the security configuration register including a non-secure (NS) bit, a secure master designation set of bits, and a lock/unlock (L/U) bit, wherein the secure master designation set of bits identifies one of the plurality of master IDs as a secure master, wherein the security configuration register is configured to be updated only by the secure master, and wherein in response to the secure master updating the L/U bit to unlocked, the security configuration register remains unlocked until the electronic device is reset;
   memory including a plurality of addressable locations defined by an address space, the address space including a secure master region, a secure guest region, and a non-secure region, wherein the non-secure region is any portion of the address space other than the secure master region and the secure guest region; and
   a memory endpoint controller coupled to the memory and configured to control access to the memory in response to memory access requests issued by the at least one processing core based at least partially on the NS bit and the L/U bit, wherein each memory access request includes a security indicator that is one of a secure master state, a secure guest state, or a non-secure state, and wherein the secure master state is a higher security level than the secure guest state and the secure guest state is a higher security level than the non-secure state, the memory endpoint controller controlling access to the memory in response to memory access requests by:
   when the NS bit is a first logical value, granting a memory access request to any of the secure master region, secure guest region, and the non-secure region regardless of the security indicator of the memory access request;
   when the NS bit is a second logical value and the L/U bit is the first logical value, granting a memory access request to the secure master region when the security indicator of the memory access request is the secure master state and denying the memory access request access to the secure master region when the security indicator of the memory access request is the secure guest state or the non-secure state, granting a memory access request to the secure guest region when the security indicator of the memory access request is the secure master state or the secure guest state and denying the memory access request access to the secure guest region when the security indicator of the memory access request is the non-secure state; and
   when the NS bit is the second logical value and the L/U bit is the second logical value, granting a memory access request to the secure master region and to the secure guest region when the security indicator of the memory access request is the secure master state or the secure guest state and denying the memory access request access to the secure master region and the secure guest region when the security indicator of the memory access request is the non-secure state.

2. The electronic device of claim 1, wherein the memory endpoint controller includes:
   at least one secure master register to store a base address defining the secure master region; and
   at least one secure guest register to store a base address defining the secure guest region.

3. The electronic device of claim 2, wherein the at least one secure master register includes:

a first secure master register that includes a first field to store a selected number of lowest order bits of the base address defining the secure master region; and a second secure master register that includes a second field to store all remaining higher order bits of the base address defining the secure master region other than the selected number of lowest order bits of the base address defining the secure master region.

4. The electronic device of claim 3, wherein the first secure master register includes a third field to store segment size information defining a size of the secure master region.

5. The electronic device of claim 2, wherein the at least one secure guest register includes:

a first secure guest register that includes a fourth field to store a selected number of lowest order bits of the base address defining the secure guest region; and a second secure guest register that includes a fifth field to store all remaining higher order bits of the base address defining the secure guest region other than the selected number of lowest order bits of the base address defining the secure guest region.

6. The electronic device of claim 5, wherein the first secure guest register includes a sixth field to store segment size information that defines a size of the secure guest region.

7. An electronic device comprising:

at least one processing core that includes a plurality of master IDs;

memory including a plurality of addressable locations defined by an address space, the address space including a secure master region, a secure guest region, and a non-secure region, wherein the non-secure region is any portion of the address space other than the secure master region and the secure guest region;

a security configuration register to store security privilege configuration information, the security configuration register including a non-secure (NS) bit, a secure master designation set of bits, and a lock/unlock (L/U) bit, wherein the secure master designation set of bits identifies one of the plurality of master IDs as a secure master, wherein the security configuration register is configured to be updated only by the secure master, and wherein in response to the secure master updating the L/U bit to unlocked, the security configuration register remains unlocked until the electronic device is reset; and a memory endpoint controller to control access to the memory by the at least one processing core based on the security configuration register, the memory endpoint controller including:

at least one secure master register to store a base address defining the secure master region;

at least one secure guest register to store a base address defining the secure guest region; and a comparator including at least one input to receive, from the at least one processing core, a memory access request that includes an address to be accessed and a security indicator, and an output to output a signal indicating whether access to the memory is granted, wherein the security indicator indicates a security state associated with a security level that is one of a secure master state, a secure guest state, or a non-secure state, and wherein the secure master state has a greater security level than the secure guest state and the secure guest state has a greater security level than the non-secure state;

wherein, when the address of the memory access request corresponds to an address in the secure master region, the signal indicates that access to the memory is granted when the security indicator is the secure master state and indicates that access to the memory is not granted when the security indicator is the secure guest state or the non-secure state;

wherein, when the address of the memory access request corresponds to an address in the secure guest region, the signal indicates that access to the memory is granted when the security indicator is the secure master state or the secure guest state and indicates that access to the memory is not granted when the security indicator is in the non-secure state; and wherein, when the address of the memory access request corresponds to an address in the non-secure region, the security state is assigned to the non-secure state when the security indicator, as received, indicates the security state is associated with the security level greater than the non-secure state, and the signal indicates that access to the memory is granted when the security indicator is the non-secure state, as received, or is a non-secure state as a result of the assignment to the non-secure state.

8. The electronic device of claim 7, wherein the at least one secure master register includes:

a first secure master register that includes a first field to store a selected number of lowest order bits of the base address defining the secure master region; and a second secure master register that includes a second field to store all remaining higher order bits of the base address defining the secure master region other than the selected number of lowest order bits of the base address defining the secure master region.

9. The electronic device of claim 8, wherein the first secure master register includes a third field to store segment size information defining a size of the secure master region.

10. The electronic device of claim 9, wherein the first field and the third field are not directly adjacent to each other within the first secure master register.

11. The electronic device of claim 7, wherein the at least one secure guest register includes:

a first secure guest register that includes a fourth field to store a selected number of lowest order bits of the base address defining the secure guest region; and a second secure guest register that includes a fifth field to store all remaining higher order bits of the base address defining the secure guest region other than the selected number of lowest order bits of the base address defining the secure guest region.

12. The electronic device of claim 11, wherein the first secure guest register includes a sixth field to store segment size information defining a size of the secure guest region.

13. The electronic device of claim 12, wherein the fourth field and the sixth field are not directly adjacent to each other within the first secure guest register.

14. The electronic device of claim 7, wherein the secure guest region of the address space includes at least two discontinuous regions.

15. A method for configuring a memory access firewall in a data processing system having a security configuration register and memory with an address space including a secure master region, a secure guest region, and a non-secure region, wherein the security configuration register is configured to be updated only by a secure master, the method comprising:

determining a logic value of a non-secure bit of the security configuration register;
determining a logic value of a lock/unlock bit of the security configuration register;
determining the secure master from a secure master designation set of bits of the security configuration register;
updating, by the secure master, the L/U bit to an unlocked state, wherein in response to the L/U bit being updated to the unlocked state, the security configuration register is configured to remain unlocked until the data processing system is reset;
when the non-secure bit has a first logic value, configuring the memory access firewall to permit access to any of the secure master region, secure guest region, and the non-secure region by a memory access request regardless of a security level indicated by a security indicator of the memory access request;
when the non-secure bit has a second logic value and the lock/unlock bit has the first logic value, configuring the memory access firewall to permit access to the secure master region by a memory access request only if a security indicator of the memory access request indicates a secure master level, permit access to the secure guest region only if the security indicator of the memory access request indicates the secure master level or a secure guest level; and
when the non-secure bit has a second logic value and the lock/unlock bit has the second logic value, configuring the memory access firewall to permit access to the secure master and to the secure guest region by a memory access request only if a security indicator of the memory access request indicates the secure master level or the secure guest level.

16. An integrated circuit comprising:
a crossbar;
a set of processing cores coupled to the crossbar and including a plurality of master IDs;
a security configuration register to store security privilege configuration information, the security configuration register including a non-secure (NS) bit, a secure master designation set of bits, and a lock/unlock (L/U) bit, wherein the secure master designation set of bits identifies one of the plurality of master IDs as a secure master, wherein the security configuration register is configured to be updated only by the secure master, and wherein in response to the secure master updating the L/U bit to unlocked, the security configuration register remains unlocked until the integrated circuit is reset; and
a memory controller coupled to the crossbar and configured to couple to a memory based on the security configuration register, wherein the memory controller includes a firewall that includes:
a first set of registers configured to store an identifier of a first region of the memory having a first security type;
a second set of registers configured to store an identifier of a second region of the memory having a second security type; and
a comparator coupled to the first set of registers and the second set of registers and configured to:
receive a request to access the memory from a first processing core of the set of processing cores, wherein the request includes an address and an attribute of the first processing core, the attribute indicating a security type;
determine, based on the first set of registers and the second set of registers, whether the address is directed to the first region, the second region, or a third region of the memory;
determine, based on the attribute of the first processing core and whether the address is directed to the first region or the second region, whether the first processing core has permission to access the address; and
in response to the address directed to the third region and the attribute of the first processing core indicating permission to access addresses associated with the first region or the second region, update the attribute to indicate a third security type associated with the third region.

17. The integrated circuit of claim 16, wherein:
the memory controller further includes a configuration register configured to store a lock bit; and
the comparator is configured to:
when the lock bit has a first value, determine that the first processing core has permission to access the address based on the attribute corresponding to a first security level; and
when the lock bit has the first value, determine that the first processing core does not have permission to access the address based on the attribute corresponding to a second security level; and
when the lock bit has a second value, determine that the first processing core has permission to access the address based on the attribute corresponding to either of the first security level or the second security level.

18. The integrated circuit of claim 16, wherein the comparator is configured to determine, based on the attribute corresponding to a secure master, that the first processing core has permission to access the first region and the second region.

19. The integrated circuit of claim 18, wherein the comparator is configured to determine, based on the attribute corresponding to a secure guest, that the first processing core has permission to access the second region but not the first region.

20. The integrated circuit of claim 16, wherein:
the memory controller further includes a configuration register configured to store an identifier; and
the comparator is configured to determine whether the first processing core has permission to access the address by comparing the attribute to the identifier.

* * * * *